United States Patent
Kaagman et al.

(10) Patent No.: US 12,292,272 B2
(45) Date of Patent: May 6, 2025

(54) SYSTEM AND METHOD FOR CONVEYING A TIRE COMPONENT

(71) Applicant: VMI Holland B.V., Epe (NL)

(72) Inventors: Mattheus Jacobus Kaagman, Epe (NL); Quinten Matthijs Bergmans, Epe (NL); Herman Sebastiaan Scherpenhuizen, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/854,222

(22) PCT Filed: Mar. 3, 2023

(86) PCT No.: PCT/NL2023/050102
§ 371 (c)(1),
(2) Date: Oct. 4, 2024

(87) PCT Pub. No.: WO2023/195845
PCT Pub. Date: Oct. 12, 2023

(65) Prior Publication Data
US 2025/0109935 A1 Apr. 3, 2025

(30) Foreign Application Priority Data
Apr. 4, 2022 (NL) ..................... 2031484

(51) Int. Cl.
*G01B 11/06* (2006.01)
*B65G 15/30* (2006.01)

(52) U.S. Cl.
CPC .......... *G01B 11/0608* (2013.01); *B65G 15/30* (2013.01); *B65G 2201/0273* (2013.01); *B65G 2203/0208* (2013.01); *B65G 2203/044* (2013.01)

(58) Field of Classification Search
None
See application file for complete search history.

(56) References Cited

U.S. PATENT DOCUMENTS

| | | | | |
|---|---|---|---|---|
| 4,778,060 A | * | 10/1988 | Wessner, Jr. .......... | B07C 5/3412 209/3.3 |
| 6,064,759 A | * | 5/2000 | Buckley ............... | G01B 11/024 348/125 |

(Continued)

FOREIGN PATENT DOCUMENTS

| | | |
|---|---|---|
| CN | 105856317 | 8/2016 |
| EP | 0548464 | 6/1993 |

(Continued)

OTHER PUBLICATIONS

Decision to Grant issued in related Japanese Patent Application Serial No. 2023-536460, dated Aug. 21, 2024, 5 pages with translation.

(Continued)

Primary Examiner — Kavel Singh
(74) Attorney, Agent, or Firm — HAYES SOLOWAY P.C.

(57) ABSTRACT

A system and a method for conveying a tire component includes a conveyor and a measuring unit, wherein the measuring unit has a field of view, wherein the measuring unit is positioned relative to the conveyor such that the field of view overlaps with a measuring slot in the conveyor for measuring height values in said field of view. The system further includes a control unit that is configured for:
  monitoring the height values measured by the measuring unit in the field of view; and
  detecting a step in the height values at the measuring slot from a first height level below the plane of conveyance to a second height level above the plane of conveyance.

26 Claims, 3 Drawing Sheets

(56) References Cited

U.S. PATENT DOCUMENTS

| | | | |
|---|---|---|---|
| 7,228,954 B2* | 6/2007 | DePaso | B29D 30/0016 |
| | | | 198/418.2 |
| 7,943,201 B2* | 5/2011 | Hendricks, Sr. | B29D 30/0662 |
| | | | 118/316 |
| 10,074,191 B1* | 9/2018 | Reome | G01S 17/87 |
| 10,607,354 B2* | 3/2020 | Lu | B65G 15/42 |
| 2020/0074654 A1 | 3/2020 | Lu et al. | |

FOREIGN PATENT DOCUMENTS

| | | |
|---|---|---|
| EP | 2125350 | 11/2012 |
| JP | 58173409 | 10/1983 |
| JP | 5975106 | 4/1984 |
| JP | 1292203 | 11/1989 |
| JP | 438418 | 2/1992 |
| JP | 5180624 | 7/1993 |
| JP | 2013224206 | 10/2013 |
| KR | 910020415 | 12/1991 |
| KR | 20110034491 | 4/2011 |
| KR | 20110065022 | 6/2011 |
| WO | WO2023195845 | 10/2023 |

OTHER PUBLICATIONS

PCT International Search Report and Written Opinion issued in PCT International Patent Application Serial No. PCT/NL2023/050102, dated May 17, 2023, 10 pages.

Decision to Grant issued in related Korean Patent Application Serial No. 10-2024-7036584, dated Dec. 10, 2024, 7 pages no translation.

* cited by examiner

SYSTEM AND METHOD FOR CONVEYING A TIRE COMPONENT

BACKGROUND

The invention relates to a system and a method for conveying a tire component.

GB 1 574 263 A discloses a an apparatus for detecting a leading edge and a trailing edge of a tire tread on a conveyor belt using a digital camera and a laser.

SUMMARY OF THE INVENTION

A disadvantage of the apparatus known from GB 1 574 263 A is that there are tire components, such as an innerliner, which are significantly thinner than a tire tread. Steps in the height of the conveyor belt as a result of surface textures, such as corrugations, or small irregularities in said belt surface, are easily mistaken for such thin tire components and may trigger a false detection of a leading edge or a trailing edge, in particular when the lateral position of the conveyor belt occasionally sways from its optimal centered position.

Moreover, irregularities in the surface of the conveyor belt may cause scattering of the laser beam, making it even more difficult to reliably distinguish the edges of thin tire components from irregularities in the belt surface.

Although it is known to provide a split conveyor belt, with means for back illumination for measuring at the split, the split parts of such split conveyor belts are difficult to steer and control synchronously.

It is an object of the present invention to provide a system and a method for conveying a tire component, wherein the tire component can be detected on a conveyor belt more reliably.

According to a first aspect, the invention provides a system comprising a conveyor for conveying a tire component and a measuring unit, wherein the conveyor comprises a conveyor belt, wherein the conveyor belt comprises a belt body extending in a longitudinal direction and having a load conveying side, wherein the belt body, at the load conveying side, defines a first support area and a second support area for together supporting the tire component in a plane of conveyance, wherein the conveyor belt comprises a measuring slot extending in the longitudinal direction in the belt body at the load conveying side, wherein the measuring slot is located between the first support area and the second support area in a lateral direction perpendicular to the longitudinal direction, wherein the measuring slot is designed to be geometrically different from the belt body in the first support area and the second support area, wherein the conveyor belt is provided with a measuring surface recessed in the measuring slot from the plane of conveyance in a recess direction transverse to said plane of conveyance, wherein the measuring unit has a field of view, wherein the measuring unit is positioned relative to the conveyor such that the field of view overlaps with the measuring slot for measuring height values in said field of view, wherein the system further comprises a control unit that is configured for:

monitoring the height values measured by the measuring unit in the field of view; and detecting a step in the height values at the measuring slot from a first height level below the plane of conveyance to a second height level above the plane of conveyance.

Because the measuring slot is designed to be geometrically different from the rest of the belt body, a reliable measuring position can be chosen within said measuring slot for detecting the step in height level, independently of height variations as a result of surface textures and/or irregularities in the rest of the belt body, which step may be indicative for the arrival of the tire component, and in particular an edge thereof, in said measuring position.

In particular, when monitoring a height level at a measuring position within said measuring slot, the first height level of the measuring surface can be measured which is below the plane of conveyance and which, in itself, is unlikely to trigger a false detection of the tire component. This first height level can act as a reliably reference for determining if a subsequent step to the second height level above the plane of conveyance in the same measuring position is indeed the result of the tire component, and in particular an edge thereof, arriving at said measuring position. The step from the first height level to the second height level within said measuring slot is not easily mistaken for height variations above the plane of conveyance as a result of a surface texture, such as corrugations, or small irregularities in said belt surface.

Conveniently, the height levels can be detected exclusively from the load conveying side, for example using laser triangulation, and do not require a split in the belt body or illuminating means below the conveyor belt.

Advantageously, the measuring surface does not need to be suitable for supporting the tire component and can therefore be dedicated and/or optimized for reliable measurement of its height level.

In one embodiment the first support area, the second support area and the measuring slot together define a belt width in the lateral direction, wherein the measuring slot has a slot width in the lateral direction that is less than twenty-five percent of the belt width. Preferably, the slot width is in a range of one to twenty percent of the belt width, preferably in a range of one to ten percent of the belt width and most preferably in a range of one to five percent of the belt width.

The measuring slot can thus be sufficiently narrow to ensure that a tire component, which is supported by the first support area and the second support area, does not show any significant sagging into the measuring slot. Consequently, the step from the first height level to the second height level can be detected reliably despite the tire component being unsupported across said measuring slot. An additional benefit is that the tire component can be kept clear off the measuring surface, thereby preventing pollution of said measuring surface.

Meanwhile, at the upper end of the specified ranges, the measuring slot can still be sufficiently wide such that the conveyor belt swaying from its optimal centered position in the lateral direction does not cause the measuring slot to move completely outside of the measuring area.

In a further embodiment the measuring slot has a slot width in the lateral direction that is in a range of five to one-hundred millimeters, preferably in a range of ten to fifty millimeters and most preferably in a range of twenty to forty millimeters. Such dimensions are sufficiently narrow for most tire components to prevent any significant sagging of the unsupported part into the measuring slot.

In another embodiment the belt body, in each support area, is provided with a corrugated support surface with corrugations extending in the longitudinal direction. The corrugations may reduce the contact area, friction and/or adherence between the support areas and the tire component. The corrugations typically have peaks and valleys with constantly changing heights which are not easily distinguishable from each other and which are not designed to provide reliable measurement results or height levels as a reference for detecting the tire component.

Preferably, the corrugated support surface has a corrugation pitch in the lateral direction between the corrugations, wherein the corrugation pitch is preferably less than five millimeters, more preferably less than three millimeters and most preferably less than two millimeters, wherein the measuring slot has a slot width in the lateral direction that is at least double the corrugation pitch, preferably at least five times the corrugation pitch and most preferably at least ten times the corrugation pitch. With such a slot width, the measuring slot can be easily distinguished from the corrugations.

In an alternative embodiment the belt body, in each support area, has a flat support surface extending in the plane of conveyance and which completely defines the respective support area. Although the flat support surface has less height variations than its corrugated counterpart, irregularities in said flat support surface may still trigger false detection of the tire component. The recessed measuring surface extending below the plane of conveyance can be easily distinguished from the flat support surface extending in the plane of conveyance.

In another embodiment the measuring surface is recessed from the plane of conveyance in the recess direction over a measuring depth of at least half a millimeter and preferably at least one millimeter. Hence, the step of the first height level at the measuring surface to the second height level can at least be equal to said measuring depth.

In another embodiment the measuring surface is flat, in particular within a flatness tolerance of less than one-tenth of a millimeter. The flatness of the measuring surface ensures that the measurement of its height level can be reliably taken at any measuring position within said measuring surface.

In another embodiment the measuring surface extends parallel or substantially parallel to the plane of conveyance. Consequently, the measuring depth of the measuring surface relative to the plane of conveyance can be kept constant or substantially constant.

In another embodiment the belt body has a center in the lateral direction, wherein the measuring slot is located in said center. If the tire component is conveyed on the conveyor belt more or less in a centered position relative to said center, said tire component will be aligned with and/or extend across the measuring slot regardless of the width of said tire component.

Alternatively, the belt body has a center in the lateral direction, wherein the measuring slot is located off-center with respect to said center. For some tire components, the edge at the center may be inconsistent or frayed as a result of the cutting process. Such tire components may be detected more reliably when measuring off-center.

In another embodiment the measuring slot is continuous along the length of the belt body in the longitudinal direction. In another embodiment the belt body is spliced in an endless loop, wherein the measuring slot is continuous along the endless loop. Hence, the tire component can be detected at any measuring position along the length of the belt body. In other words, the tire component can be detected continuously. Moreover, the leading end and the trailing end of the tire component may be detected simultaneously in spaced apart positions along said length of the belt body.

In another embodiment the measuring surface is formed by the belt body. With the measuring surface being part of the belt body, the integrity of the belt body can be ensured. In other words, the belt body can be advanced uniformly, in contrast to the prior art split belt conveyor.

Alternatively, the conveyor belt is provided with a measuring insert inserted in the measuring slot to form the measuring surface. The measuring insert may be produced in a manner different from the belt body, i.e. with a smaller flatness tolerance or with different material characteristics. Moreover, the measuring insert may be exchangeable depending on the characteristics required for the tire component T that is being measured.

Preferably, the measuring insert comprises a material different in color or composition from the belt body. Hence, the measuring surface can be distinguished more easily from the belt body.

In another embodiment the measuring surface is formed by a material that is reflective or luminescent. A reflective measuring surface can increase the difference between the amount of light reflected by the measuring surface and the amount of light reflected by the tire component. A luminescent material may acts as a source of backlight and increase the contrast and/or make the contour of the tire component more easily observable.

According to a second aspect, the invention provides a method for conveying a tire component using the system according to any one of the embodiments of the first aspect of the invention, wherein the method comprises the steps of:
 conveying the tire component in the plane of conveyance while the tire component spans the measuring slot in the lateral direction;
 monitoring height values in a field of view that overlaps with the measuring slot; and
 detecting a step in the height values at the measuring slot from a first height level below the plane of conveyance to a second height level above the plane of conveyance.

The method relates to the practical implementation of the conveyor belt in steps of a method for detecting the tire component on the conveyor belt and therefore has the same technical advantages as mentioned before in relation to the conveyor belt. These advantages will not be repeated hereafter.

In one embodiment of the method the height values are monitored using laser triangulation within said field of view.

In another embodiment the method further comprises the step of identifying the step in the height values from the first height level to the second height level as an edge of the tire component.

In a further embodiment of the method the tire component remains clear off the measuring surface, thereby preventing pollution of said measuring surface.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
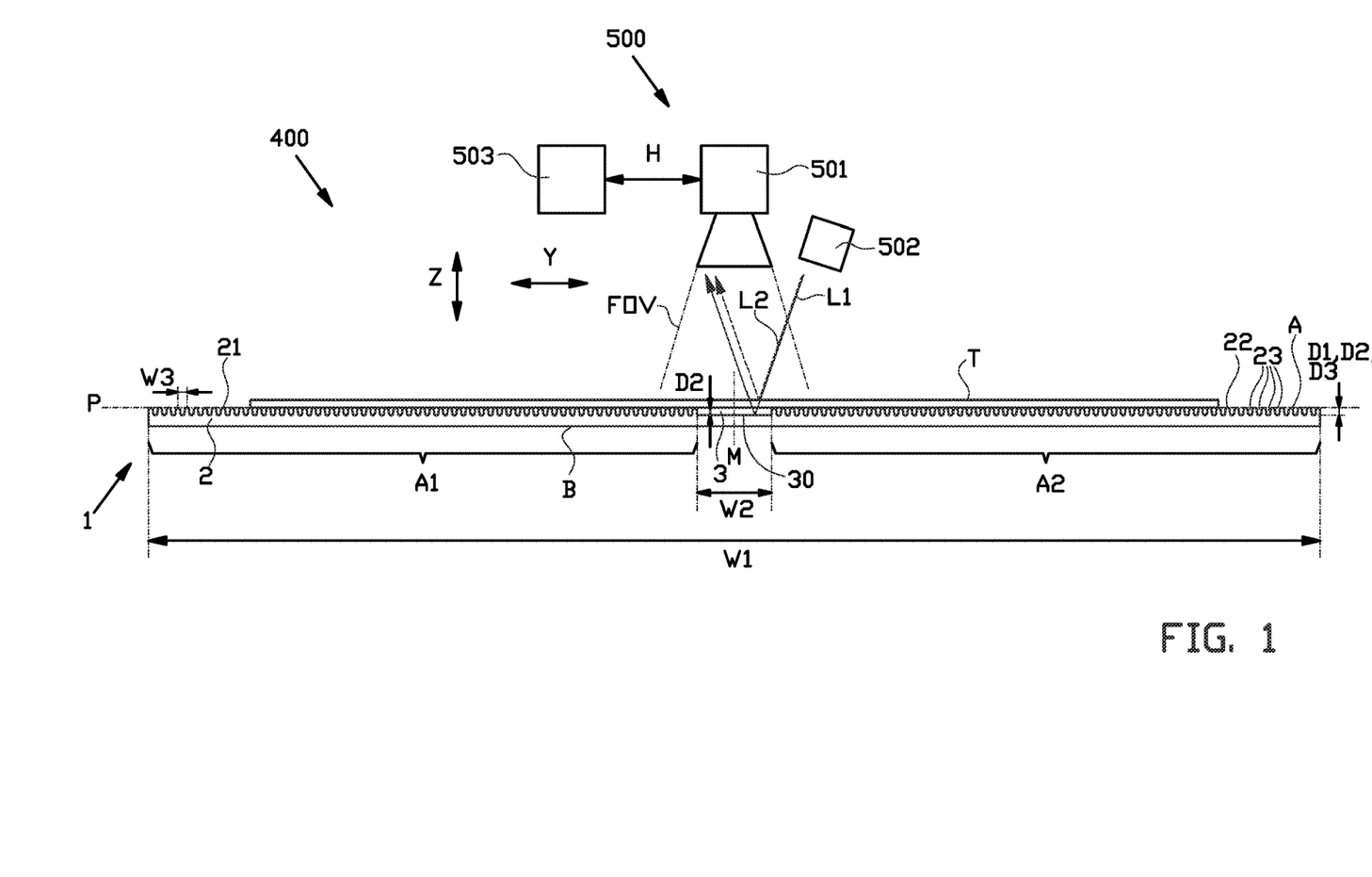
FIG. 1 shows a cross section of a system according to a first exemplary embodiment of the invention, comprising a conveyor belt for conveying a tire component.

FIG. 1 shows a system 500 comprising a conveyor 400, a measuring unit 501, a laser unit 502 for cooperating with the measuring unit 501 in a laser-triangulation setup and a control unit 503 for processing signals or data from the measuring unit 501.

The conveyor 400 comprises a conveyor belt 1 according to a first exemplary embodiment of the invention. The conveyor belt 1 is used for conveying sheet like articles. In this example, the conveyor belt 1 is used in a process of tire building or tire manufacturing for conveying a tire component T, for example an inner-liner, a body ply, a breaker ply, a side wall, a strip, a tread or a combination thereof, for example a pre-assembly. Such tire components T typically comprise unvulcanized, rubber or elastomeric material, which is still relatively soft and tacky.

The conveyor belt 1 comprises a belt body 2 extending in a longitudinal direction X. In this example, the ends of the belt body 2 in said longitudinal direction X are joined or spliced to form an endless loop. The conveyor 400 may further comprise one or more pulleys (not shown) to guide and/or advance the belt body 2 in a direction of conveyance along an upper-run of said endless loop.

As best seen in FIG. 1, the belt body 2 has a load carrying or load conveying side A and a non-conveying side B, opposite to said load conveying side A. The load conveying side A defines a plane of conveyance P for supporting the tire component T. The load conveying side A faces upwards and can therefore support and retain the tire component T on the belt body 2 in the plane of conveyance P under the influence of gravity.

Figure 2:
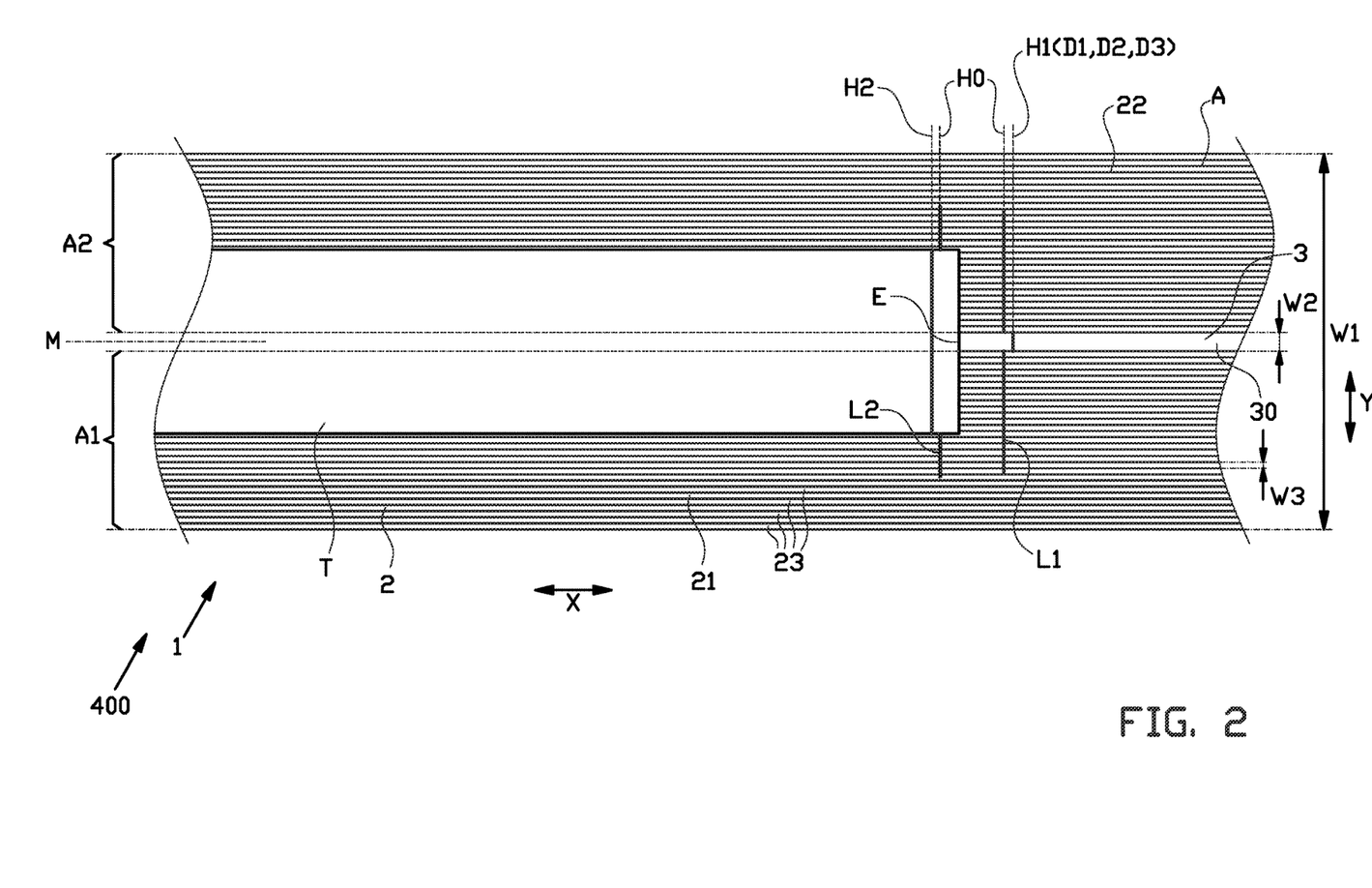
FIG. 2 shows a top view of the conveyor belt according to FIG. 1.

As best seen in FIG. 2, the conveyor belt 1 defines a measuring slot 3 extending in the longitudinal direction X through belt body 2 at the load conveying side A. In particular, the measuring slot 3 is continuous along the length of the belt body 2 in the longitudinal direction X. More in particular, the measuring slot 3 is continuous along the endless loop of said belt body 2.

The belt body 2, at the load conveying side A, further defines or comprises a first support area A1 and a second support area A2 extending on opposite sides of the measuring slot 3 in the lateral direction Y. The first support area A1 and the second support area A2 are configured, arranged or adapted for together supporting the tire component T in the plane of conveyance P. In other words, the first support area A1 and the second support area A2 are positioned relative to each other such that the tire component T can be supported simultaneously by both support areas A1, A2. Preferably, in use, the tire component T is supported solely by said the aforementioned support areas A1, A2.

The first support area A1, the second support area A2 and the measuring slot 3 together define a belt width W1 in the lateral direction Y. In this example, the overall width of the conveyor belt 1 in the lateral direction Y corresponds to the belt width W1. Alternatively, the overall width of the conveyor belt 1 may be wider, for example if the belt body 2 is provided with one or more edge areas which are not intended for supporting the tire component T. The measuring slot 3 has a slot width W2 in the lateral direction Y.

In this example, the belt body 2 has a center M in the lateral direction Y, in particular at half the belt width W1. The measuring slot 3 is located at or in said center M. Furthermore, the belt body 2 may be symmetrical relative to said center M.

It is pointed out that the scale and/or proportions of the first support area A1, the second support area A2 and the measuring slot 3 in the drawings has been exaggerated to more clearly show the features of the conveyor belt 1 and are not in any way supposed to reflect the actual scale and/or proportions as referred to hereafter. In fact, in practice, the belt width W1 may be in excess of one-thousand millimeters (one meter), while the slot width W2 may be as small as ten millimeters (one percent of the belt width W1).

The measuring slot 3 is preferably dimensioned and/or shaped such that the tire component T is unsupported at the location of the measuring slot 3, as shown in FIG. 1. It will be appreciated that this condition is dependent on the material characteristics of the tire component T that is being supported on the conveyor belt 1. However, for most tire components T is will be sufficient if the slot width W2 in the lateral direction Y is less than twenty-five percent of the belt width W1. Depending on the material characteristics of the tire component T, the slot width W2 may even be in a range of one to ten percent of the belt width W1 or in a range of one to five percent of the belt width W1. In absolute numbers, the slot width W2 may be in a range of five to one-hundred millimeters, preferably in a range of ten to fifty millimeters and more preferably in a range of twenty to forty millimeters.

In this example, the belt body 2, in each support area A1, A2, is provided with a corrugated support surface 21, 22 to reduce the contact area, friction and/or adherence with the tire component T within said support areas A1, A2. In particular, the support surfaces A1, A2 are provided with corrugations 23, e.g. peaks and valleys, extending in the longitudinal direction X. The peaks of the corrugations 23 extend in and define the plane of conveyance P.

It is noted that the number of corrugations 23 in the drawings is not in any way supposed to reflect the actual number of corrugations 23. In fact, in reality, both support surfaces A1, A2 combined may feature in excess of five-hundred or one-thousand corrugations 23. The corrugations 23 may have a corrugation pitch W3, i.e. the distance between the corrugations 23 from peak-to-peak in the lateral direction Y, as small as one millimeter. In this example, the corrugations 23 have a corrugation depth D1 of less than one millimeter, preferably approximately half a millimeter.

As an alternative to the earlier specifications of the slot width W2, the slot width W2 may further be defined as being at least double the corrugation pitch W3, preferably at least five times the corrugation pitch W3 and most preferably at least ten times the corrugation pitch W3.

As best seen in FIG. 1, the measuring slot 3 is recessed from the plane of conveyance P in a recess direction Z transverse or perpendicular to the plane of conveyance P over a slot depth D3 of at least half a millimeter and preferably at least one millimeter. In this example, the slot depth is equal or substantially equal to the corrugation depth D1.

The measuring slot 3 is geometrically different, discernable or distinguishable from the belt body 2 in the first support area A1 and the second support area A2. In the context of the present invention, the term 'distinguishable' is to be interpreted as something that is clear enough to be recognized or identified as different. The term 'geometrically' relates to the relationship, scale and/or proportions of shapes, lines, edges, surfaces, and/or points that make up the contour of the measuring slot 3 and the support areas A1, A2.

In particular, the recess defined by said measuring slot 3 in the belt body 2 below or relative to the plane of conveyance P is significantly different in shape, size or proportion to the valleys between the corrugations 23 and the plane of conveyance P.

For the purpose of the present invention, the measuring slot 3 is distinguishable from the support areas A1, A2 with the use of the measuring unit 501, in particular an optical imaging device such as an optical camera or a line-scan camera, preferably assisted by the laser unit 502, i.e. with laser triangulation. Preferably, the measuring slot 3 is also distinguishable from the support areas A1, A2 with the human eye or the naked eye.

It is noted that differences that are within normal tolerances of the manufacturing process of the conveyor belt 2 are not considered suitable to distinguish the measuring slot 3 from the support areas A1, A2. In other words, the measuring slot 3 is geometrically different by design, thereby ruling out unintended and/or microscopic variations.

As shown in FIG. 1, the conveyor belt 1 is provided with a measuring surface 30 that is recessed in the measuring slot 3 from the plane of conveyance P in the recess direction Z at a measuring depth D2 equal to the slot depth D3. In this example, the measuring surface 30 is formed at or by the bottom of the measuring slot 3, which is a part of the belt body 2, in particular an integral part. The measuring surface 30 is therefore made from the same material as the belt body 2. The measuring surface 30 may optionally be coated, painted or treated with a contrasting, luminescent or reflective layer or film to more clearly distinguish the measuring surface 30 from the rest of the belt body 2.

The measuring surface 30 is flat. In particular, the measuring surface 30 extends parallel or substantially parallel to the plane of conveyance P. Preferably, the measuring surface 30 is flat within a flatness tolerance of less than one-tenth of a millimeter. In the context of the present invention, the term 'flatness tolerance' is to be interpreted as a value indicative of the distance between two parallel planes between which the entire measuring surface must lie. Preferably, the measuring surface 30 has a width that is subject to the same constraints as specified earlier for the slot width W2. In particular, the measuring surface extends over at least eighty percent, preferably at least ninety percent and most preferably the entire slot width W2.

Figure 3:
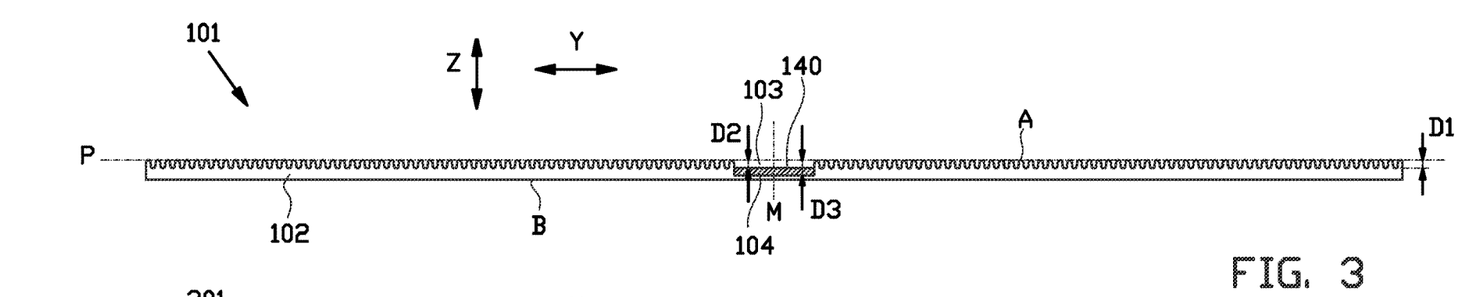
FIGS. 3, 4 and 5 show cross sections of alternative conveyor belts according to a second exemplary embodi-

FIG. 3 shows an alternative conveyor belt 101 according to a second exemplary embodiment of the invention, that differs from the aforementioned conveyor belt 1 in that the belt body 102 is provided with a measuring slot 103 with a slot depth D3 that is sufficient for receiving a measuring insert 104. The measuring insert 104 forms or defines the measuring surface 140 at a measuring depth D2 that is smaller than said slot depth D3. The measuring insert 104 may comprise a material different in color or composition from the belt body 102, for example a material that is contrasting, reflective or luminescent. The measuring insert 104 may be exchangeable depending on the characteristics required for the tire component T that is being measured.

Figure 4:
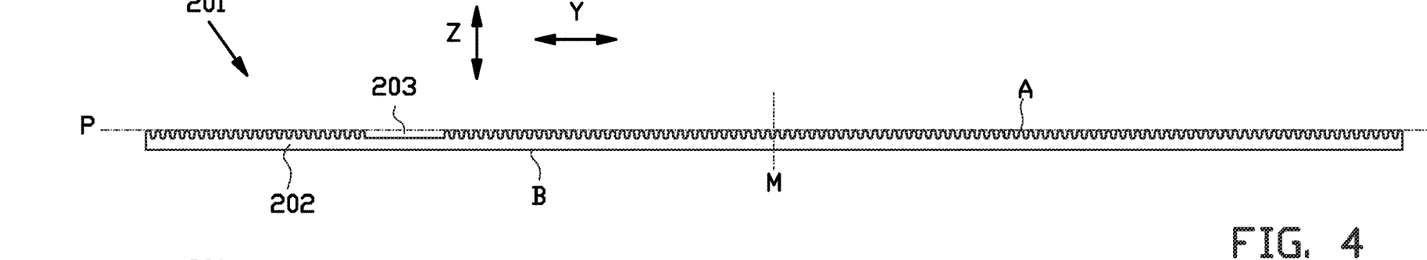

FIG. 4 shows a further alternative conveyor belt 201 according to a third exemplary embodiment of the invention, that differs from the aforementioned conveyor belts 1, 101 in that the belt body 202 is provided with a measuring slot 203 that is located off-center with respect to the center M of said belt body 202. This may be beneficial when the shape of the tire component T to be measured is inconsistent or irregular at the center M and the edge E may be determined more reliably in an off-center position.

Figure 5:
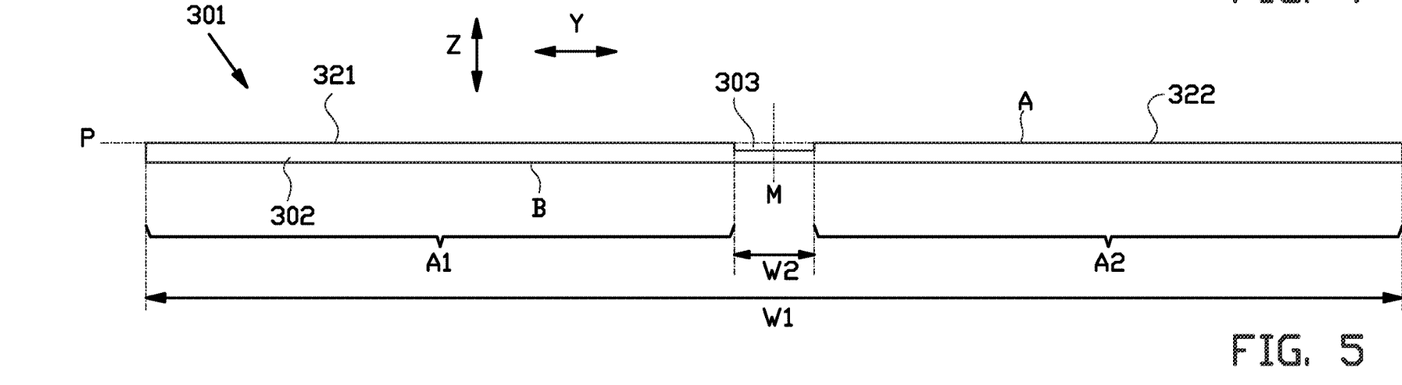

FIG. 5 shows a further alternative conveyor belt 301 according to a fourth exemplary embodiment of the invention, that differs from the aforementioned conveyor belts 1, 101, 201 in that the belt body 302, in each support area A1, A2, has a flat support surface 321, 322 extending in the plane of conveyance P. The flat support surfaces 321, 322 completely defines the respective support area A1, A2.

A method for conveying a tire component T will now be elucidated below with the use of the conveyor belt 1 according to FIGS. 1 and 2. It will be appreciated that the same method may also be applied, mutatis mutandis, to the conveyor belts 101, 201, 301 of FIGS. 3, 4 and 5, respectively.

In a first step of the method, the tire component T is transported or conveyed in the plane of conveyance P while the tire component T bridges, spans or extends over the measuring slot 3 in the lateral direction Y.

As shown in FIG. 1, the laser unit 502 is configured for emitting or projecting a laser projection, in this example a laser line L1, L2, onto the conveyor belt 1 at an oblique angle to the optical axis of the measuring unit 501, for the purpose of measuring height values H in the recess direction Z via laser triangulation. The laser projection may alternatively comprise one or more laser points, laser dots or another suitable shape. In particular, the laser line L1, L2 is projected such that it extends in the lateral direction Y across the measuring slot 3. In FIG. 1, the laser unit 502 is angularly offset to the measuring unit 501 in a lateral plane. In practice, however, the laser unit 502 would probably be angularly offset to the measuring unit 501 in a longitudinal plane. In this example, the measuring unit 501 is arranged with its optical axis perpendicular to the plane of conveyance P and the laser unit 502 is arranged at an oblique angle to said plane of conveyance P. Alternatively, the laser unit 502 may be arranged perpendicularly with the measuring unit 501 being angularly offset. The measuring unit 501 has a field of view FOV that overlaps with the measuring slot 3.

It is noted that, schematically, FIGS. 1 and 2 show two laser lines L1, L2 in a slightly offset manner for comparison of the behavior of said laser lines L1, L2 with and without the tire component T. The two laser lines L1, L2 may however be the same laser line L1, L2, i.e. projected in the same position on the conveyor belt 1, yet at different moments in time. In particular, the first laser line L1 is the laser line projected onto the conveyor belt 1 when the tire component T does not cover the measuring slot 3 at the position of said laser line L1. The second laser L2 is the same or another laser line projected conveyor belt 1 and/or the tire component T when the tire component T covers the measuring slot at the position of said laser line L2.

During conveyance of the tire component T, the height values H from the measuring unit 501 are monitored, continuously or at intervals. Signals or data from the measuring unit 501 are received and/or processed by the control unit 503.

Note that for the first laser line L1, the height value H measured at the peaks of the support areas A1, A2 is at a base level H0 corresponding to the plane of conveyance P. Although the valleys of the corrugations 23 may return other height values H, these variations occur only in the relatively narrow valleys and may be cancelled out as noise relative to the base level H0 of the support areas A1, A2 as a whole.

In contrast, at the measuring surface 30, which is still exposed in case of the first laser line L1, a first height level H1 below the plane of conveyance P may be detected or measured consistently, in a sustained or continuous manner and/or over a substantial part of the slot width W2. In other words, the measuring slot 3 can be easily distinguished from the support areas A1, A2 and the first height level H1 of the measuring surface 30 recessed therein can be reliably measured, detected and/or determined. At the lateral sides of the measuring slot 3, a step can be observed in the height values H between the base level H0 and the first height level H1.

When the tire component T is conveyed in the longitudinal direction X of the conveyor belt 1, it will eventually arrive at the position of the first laser line L1, which then changes into the second laser line L2. As mentioned before, the measuring slot 3 is dimensioned and/or shaped such that the tire component T remains unsupported at the measuring slot 3. Moreover, the tire component T is to remain clear off the measuring surface 30. In particular, the slot width W2 is chosen such that the unsupported part of tire component T does not show any significant sagging into the measuring slot 3 with respect to the rest of the tire component T supported at the support areas A1, A2.

Consequently, across the entire width of the tire component T, height values H will increase to a second height level H2 above the plane of conveyance P. In other words, the second height level H2 is greater than the base level H0 and the first height level H1. More in particular, at the measuring slot 3, a step in the height values H may be detected between the first laser line L1 and the second laser line L2 from the first height level H1 to the second height level H2. This step is considerably larger than the step from the base level H0 to the second height level H2 and can therefore be used as a reliable indicator for identifying that the tire component T, and more specifically an edge E thereof, has arrived at or has passed the position of the second laser line L2. The control unit 503 of FIG. 1 is configured, programmed, adapted and/or arranged to monitor, store and/or process the signals and/or data received from the measuring unit 501 to detect said step and/or to determine and/or identify the step as an edge E of said tire component T.

This method can be used to detect the so-called 'leading end' or 'leading edge' of the tire component T. The same method may also be used to detect the so-called 'trailing end' or 'trailing edge' of the same tire component T, for the purpose of determining a length of the tire component T between said ends or edges.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 conveyor belt
2 belt body
21 first support surface
22 second support surface
23 corrugation
3 measuring slot
measuring surface
101 alternative conveyor belt
102 belt body
103 measuring slot
104 measuring insert
140 measuring surface
201 further alternative conveyor belt
202 belt body
203 measuring slot
301 further alternative conveyor belt
302 belt body
321 first support surface
322 second support surface
303 measuring slot
400 conveyor
500 system
501 measuring unit
502 laser unit
503 control unit
A load conveying side
A1 first support area
A2 second support area
B non-conveying side
D1 corrugation depth
D2 measuring depth
D3 slot depth
E edge
H height value
H0 base level
H1 first height level
H2 second height level
FOV field of view
L1 first laser beam
L2 second laser beam
M center
P plane of conveyance
T tire component
W1 belt width
W2 slot width
W3 corrugation pitch
X longitudinal direction
Y lateral direction
Z recess direction

The invention claimed is:

1. A system comprising a conveyor for conveying a tire component and a measuring unit, wherein the conveyor comprises a conveyor belt, wherein the conveyor belt comprises a belt body extending in a longitudinal direction and having a load conveying side, wherein the belt body, at the load conveying side, defines a first support area and a second support area for together supporting the tire component in a plane of conveyance, wherein the conveyor belt comprises a measuring slot extending in the longitudinal direction in the belt body at the load conveying side, wherein the measuring slot is located between the first support area and the second support area in a lateral direction perpendicular to the longitudinal direction, wherein the measuring slot is designed to be geometrically different from the belt body in the first support area and the second support area, wherein the conveyor belt is provided with a measuring surface recessed in the measuring slot from the plane of conveyance in a recess direction transverse to said plane of conveyance, wherein the measuring unit has a field of view, wherein the measuring unit is positioned relative to the conveyor such that the field of view overlaps with the measuring slot for measuring height values in said field of view, wherein the system further comprises a control unit that is configured for:
  monitoring the height values measured by the measuring unit in the field of view; and
  detecting a step in the height values at the measuring slot from a first height level below the plane of conveyance to a second height level above the plane of conveyance.

2. The system according to claim 1, wherein the first support area, the second support area and the measuring slot together define a belt width in the lateral direction, wherein the measuring slot has a slot width in the lateral direction that is less than twenty-five percent of the belt width.

3. The system according to claim 2, wherein the slot width is in a range of one to twenty percent of the belt width.

4. The system according to claim 1, wherein the measuring slot has a slot width in the lateral direction that is in a range of five to one-hundred millimeters.

5. The system according to claim 1, wherein the belt body, in each support area, is provided with a corrugated support surface with corrugations extending in the longitudinal direction.

6. The system according to claim 5, wherein the corrugated support surface has a corrugation pitch in the lateral direction between the corrugations, wherein the measuring slot has a slot width in the lateral direction that is at least double the corrugation pitch.

7. The system according to claim 6, wherein the corrugation pitch is less than five millimeters.

8. The system according to claim 1, wherein the belt body, in each support area, has a flat support surface extending in the plane of conveyance and which completely defines the respective support area.

9. The system according to claim 1, wherein the measuring surface is recessed from the plane of conveyance in the recess direction over a measuring depth of at least half a millimeter.

10. The system according to claim 1, wherein the measuring surface is flat.

11. The system according to claim 1, wherein the measuring surface is flat within a flatness tolerance of less than one-tenth of a millimeter.

12. The system according to claim 10, wherein the measuring surface extends parallel to the plane of conveyance.

13. The system according to claim 1, wherein the belt body has a center in the lateral direction, wherein the measuring slot is located in said center.

14. The system according to claim 1, wherein the belt body has a center in the lateral direction, wherein the measuring slot is located off-center with respect to said center.

15. The system according to claim 1, wherein the measuring slot is continuous along the length of the belt body in the longitudinal direction.

16. The system according to claim 1, wherein the belt body is spliced in an endless loop, wherein the measuring slot is continuous along the endless loop.

17. The system according to claim 1, wherein the measuring surface is formed by the belt body.

18. The system according to claim 1, wherein the conveyor belt is provided with a measuring insert inserted in the measuring slot to form the measuring surface.

19. The system according to claim 18, wherein the measuring insert comprises a material different in color or composition from the belt body.

20. The system according to claim 1, wherein the measuring surface is formed by a material that is reflective or luminescent.

21. The system according to claim 1, wherein the system further comprises a laser unit angularly offset with the measuring unit for projecting a laser projection on the conveyor belt within said field of view.

22. The system according to claim 21, wherein the laser projection extends in the lateral direction across the measuring slot.

23. A method for conveying a tire component using the system according to claim 1, wherein the method comprises the steps of:
 conveying the tire component in the plane of conveyance while the tire component spans the measuring slot in the lateral direction;
 monitoring height values in a field of view that overlaps with the measuring slot; and
 detecting a step in the height values at the measuring slot from a first height level below the plane of conveyance to a second height level above the plane of conveyance.

24. The method according to claim 23, wherein the height values are monitored using laser triangulation within said field of view.

25. The method according to claim 23, wherein the method further comprises the step of identifying the step in the height values from the first height level to the second height level as an edge of the tire component.

26. The method according to claim 23, wherein the tire component remains clear off the measuring surface.

* * * * *